(12) United States Patent
Flynn

(10) Patent No.: US 8,068,285 B1
(45) Date of Patent: Nov. 29, 2011

(54) INFINITY DISPLAY WITH AUTOSTEREOSCOPIC CAPABILITY

(75) Inventor: Sean Thomas Flynn, Gloucester (GB)

(73) Assignee: Sean Thomas Flynn, Longlevens, Gloucester (GB)

( * ) Notice: Subject to any disclaimer, the term of this patent is extended or adjusted under 35 U.S.C. 154(b) by 56 days.

(21) Appl. No.: 12/688,867

(22) Filed: Jan. 16, 2010

Related U.S. Application Data

(60) Provisional application No. 61/179,501, filed on May 19, 2009.

(51) Int. Cl.
*G02B 27/10* (2006.01)
(52) U.S. Cl. .................. 359/619; 359/621; 359/630
(58) Field of Classification Search .................. 359/619, 359/621, 630
See application file for complete search history.

(56) References Cited

U.S. PATENT DOCUMENTS 6,671,100 B1* 12/2003 McRuer .................. 359/630
2004/0263974 A1* 12/2004 McDonough et al. ........ 359/487

* cited by examiner

*Primary Examiner* — Ricky Mack
*Assistant Examiner* — James Jones

(57) ABSTRACT

An infinity display device with autostereoscopic capability having one or more high lumen light sources 6, a transmissive spatial light modulator (SLM) 7, light collimating optics and a rectilinear light guide. Once the light has passed through the SLM 7 an objective 2 converges the image encoded rays toward a point 43 representing the entrance pupil 5 of said light guide. A second lens 1 then collimates the rays in one plane (Tangential) while a lenticular array 13 is used for collimating rays in the second plane (Sagittal). Next, a first surface mirror 9 reflects all said rays toward a triangular prism 10, where they undergo colour separation before entering the light guide. The light guide may itself consist of two, parallel, first surface mirrors 3 & 4 one of which is partially transmissive. Finally a Fresnel screen 11 tilts the light toward the observer.

18 Claims, 14 Drawing Sheets

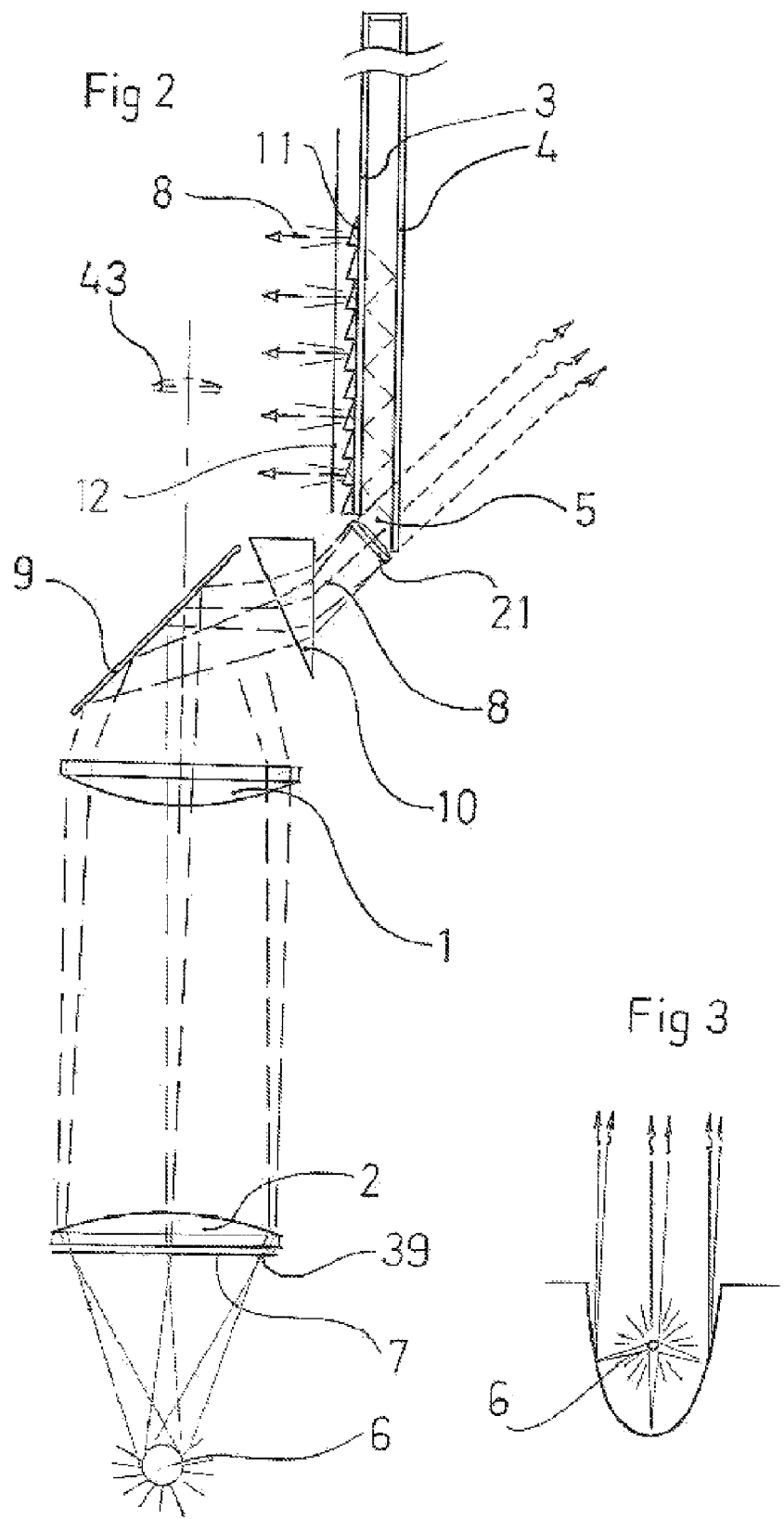

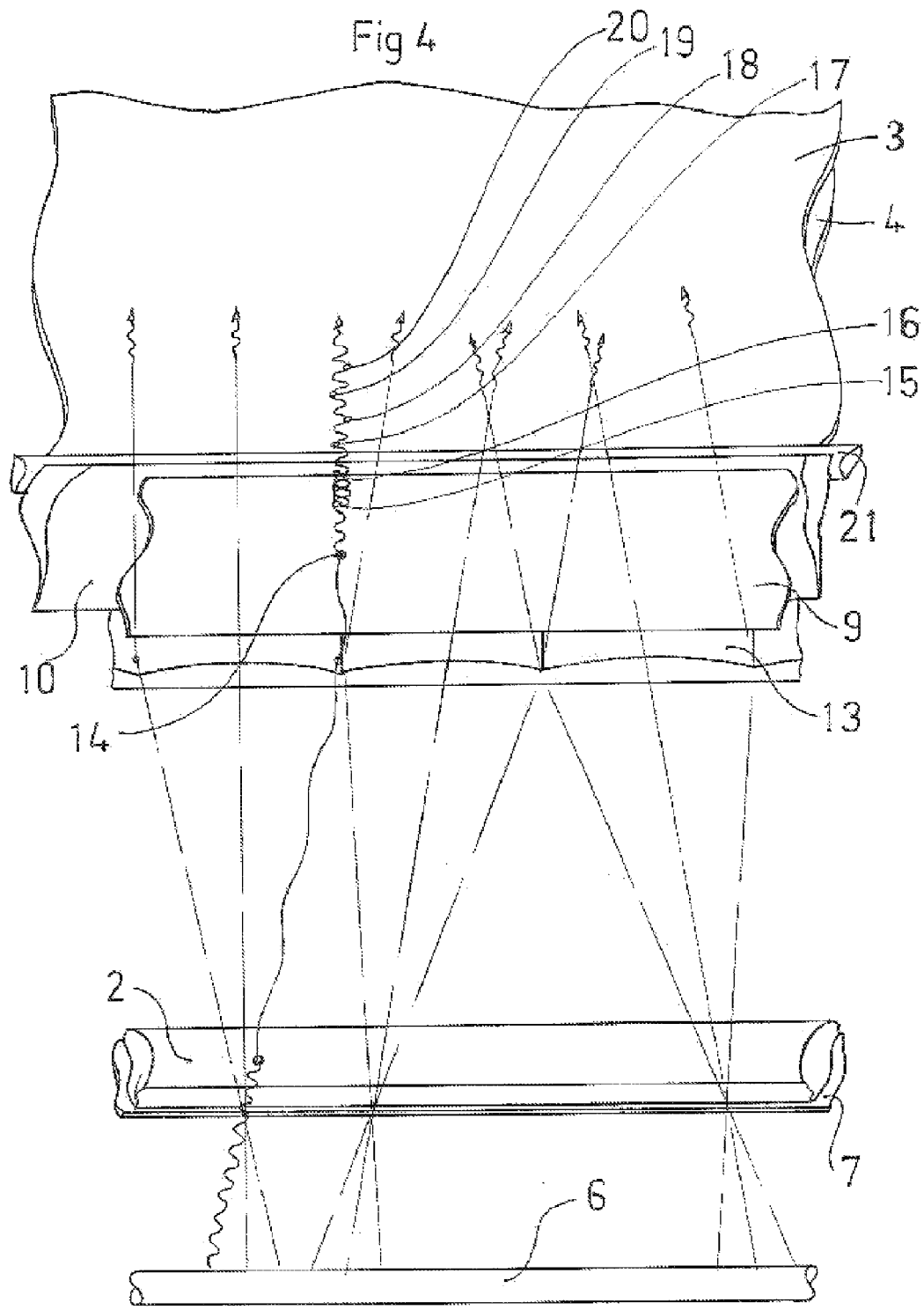

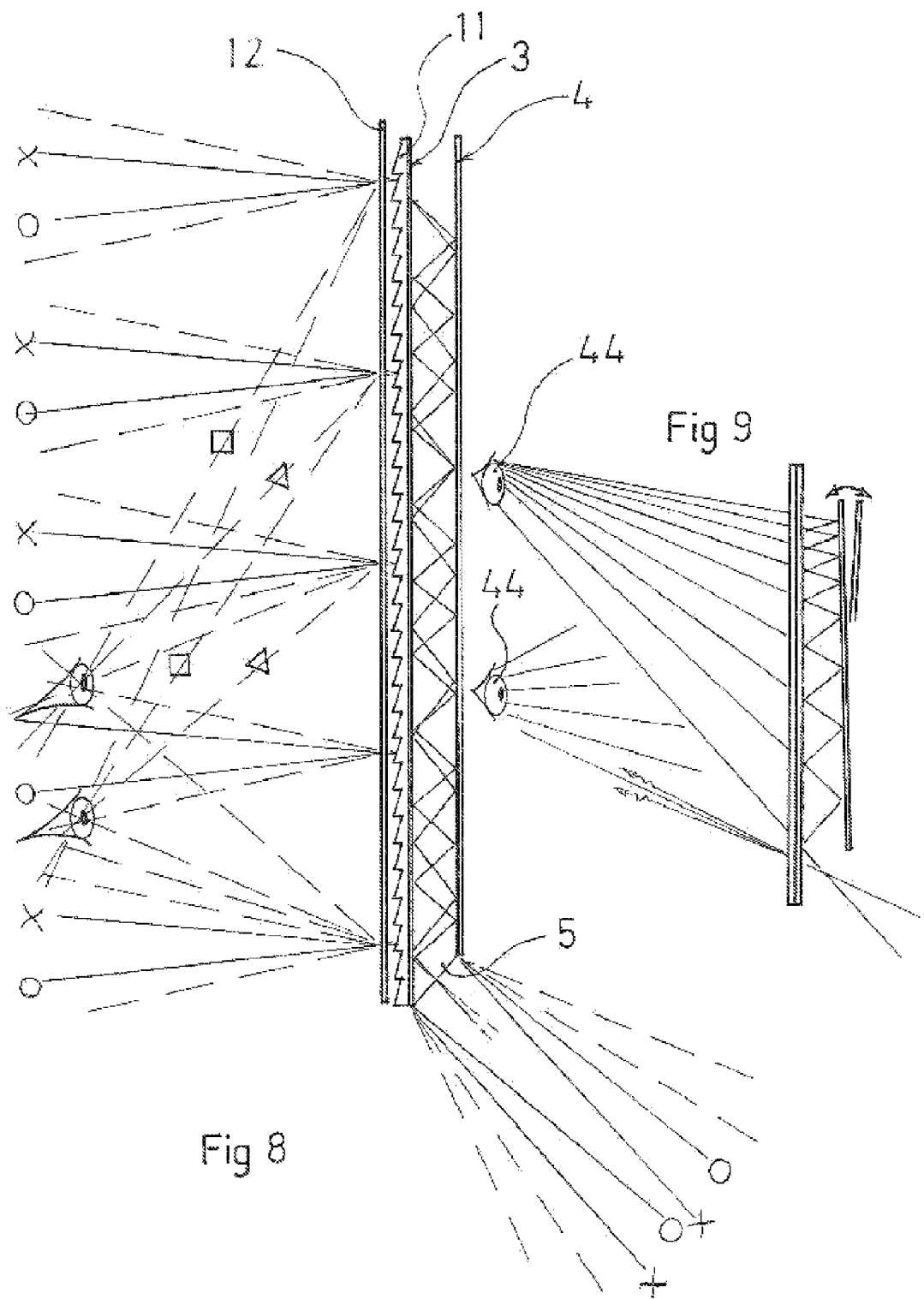

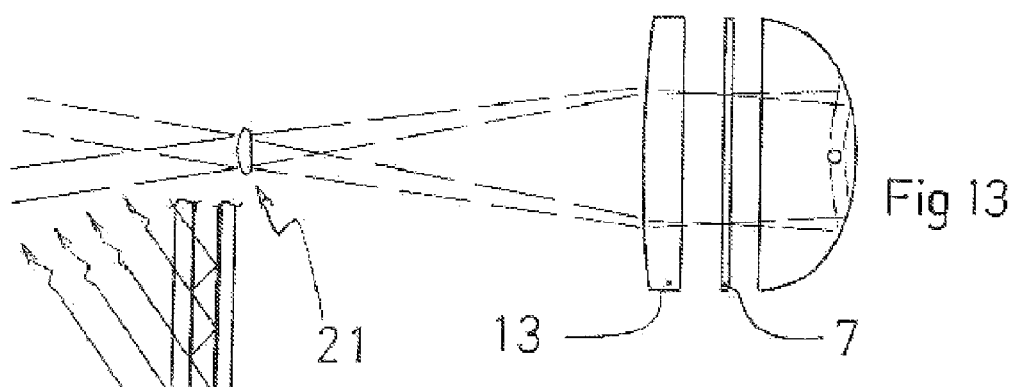
Fig 13
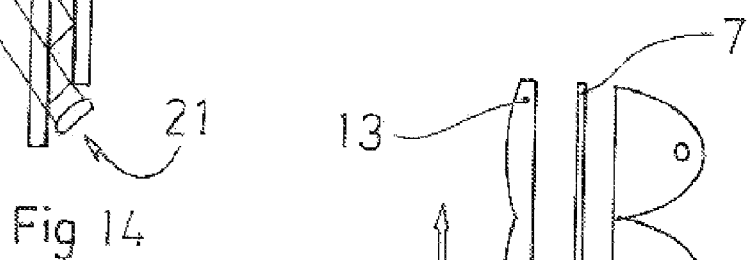
Fig 14
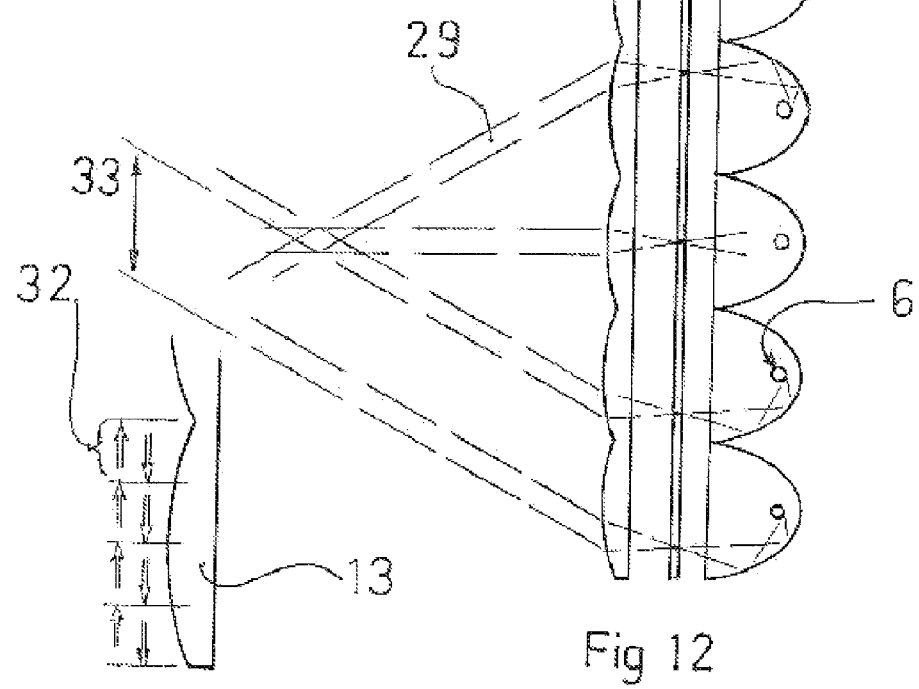
Fig 12
Fig 11

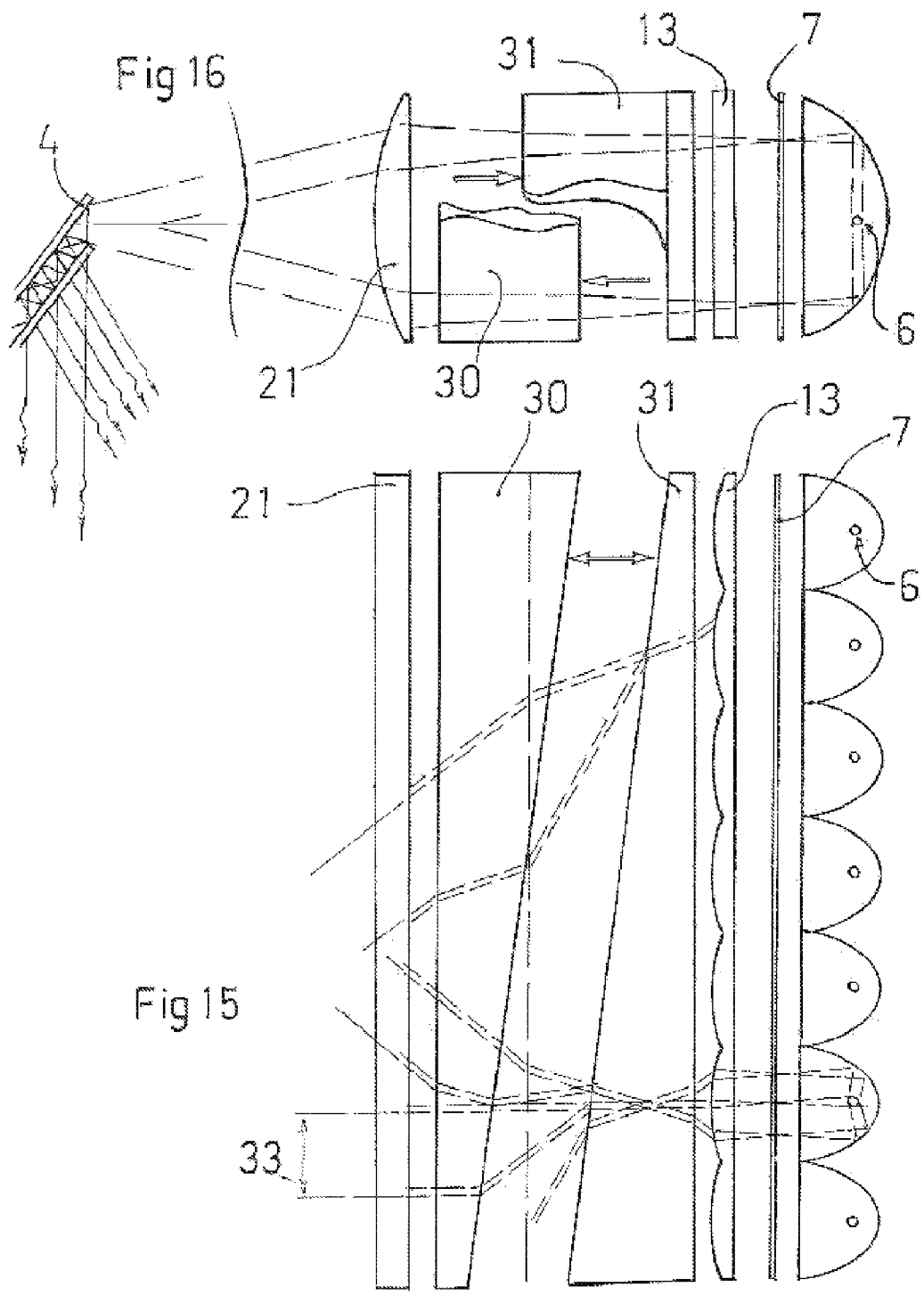

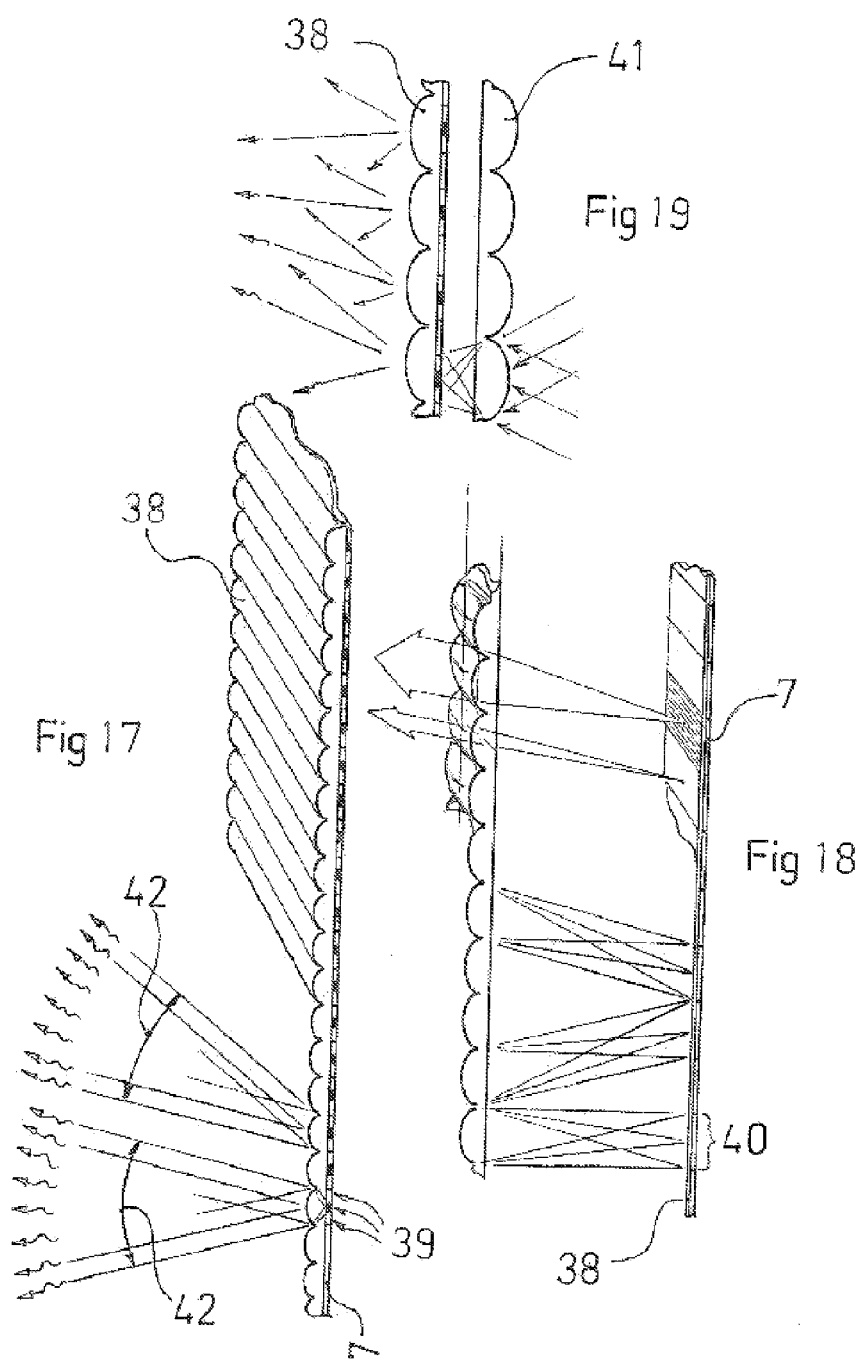

INFINITY DISPLAY WITH AUTOSTEREOSCOPIC CAPABILITY

REFERENCE TO PROVISIONAL PATENT APPLICATION

This application claims priority to U.S. provisional application Ser. No. 61/179,501 filed 19 May 2009 and British application number GB20080002619 (Publication number GB2450192), filed 13 Feb. 2008 (patent issued 17 Jun. 2009).

BACKGROUND OF THE INVENTION

The following invention relates to what is commonly known as an infinity display, a class of viewing device that is capable of displaying images or scenes as if they were set at or approaching, "infinity focus".

Such displays are commonly used in aircraft flight simulators recreating aerial vistas at optical infinity, offering the trainee pilot a highly credible panorama. However, the optical components that constitute the prior art tend to be large and very expensive, hence infinity displays tend to be restricted to applications where space is not a significant issue and price gives way to necessity. Furthermore, unlike the present invention, such infinity displays do not offer autostereoscopic views and motion parallax.

The prior art essentially requires that a single image undergoes magnification, where all point sources emanating from the display screen e.g. a CRT or LCD are enlarged to the extent that their light rays become or approach, collimation. This creates the illusion of depth as all virtual images appear deeper than their corresponding point source and as magnification increases so the image recedes into the distance.

However, non-paraxial (i.e. non-centred) rays are subject to distortion. To minimise chromatic distortion and other optical aberrations, heavy compound lenses are frequently used especially in the case of large simulator displays, coupled with beam-splitters and sizeable first surface mirrors. Even then, the resulting anastigmatic system provides a relatively narrow angular view as the objective lens is limited in its ability to accurately focus non-paraxial rays that emerge from the periphery of the SLM.

The aforementioned reduced breadth of view together with the prior art's size and cost prohibit it from being used in many other applications that could potentially benefit from the technology.

HinesLab Inc., have developed a Cylindrical Catadiotropic Infinity Display (CCID) that employs thin section, astigmatic lenses, beam splitters and polarisers to reduce the weight and size of the system. Although a clever arrangement offering a broader angular view, the depth of the optical arrangement (stacked optics) likely restricts or precludes its use in many applications such as to be found in the entertainment industry, advertising and quite significantly, the domestic sector.

The above problem is addressed in WO 2005/124428 filed by Dr Amitai Yaakov by offering spectacles that like many helmet mounted systems today, use total internal reflection to bounce an image within a transparent light guide toward a reflective interface. This allows the image to break out or "uncouple" from the light guide whilst simultaneously directing it toward the wearer's eye. In the case of WO 2005/124428, the reflective interface is a stack of partially reflective surfaces that are angled toward the wearer. These systems are ideal for "beaming" images into a recipient's eye but are not designed for, nor lend themselves to, large multi-viewer displays for several reasons. First, the reflective surfaces incorporated into the light guide would make it expensive and difficult to fabricate if scaled up to the dimensions of a conventional flat screen display. Secondly, said juxtaposed partially reflective surfaces will begin to impinge or separate from one another as you move your head from side to side, creating unwelcome image artefacts.

Other infinity display technologies are intended for use in "head up displays" (HUD's).

U.S. Pat. Nos. 1,538,545; 4,711,512 and 5,076,664 relate to HUDs that use light guides and uncoupling optics to present a collimated image to a pilot's eye(s). However, each of these is clearly limited in terms of their display width as they are designed to collimate a SLM's image using centrally stacked collimating lenses comparable in width to the display's entrance pupil, thus a wide screen would necessitate a wide objective (or centrally stacked lenses) situated at a commensurately distant focal point. As in WO2005/124428 above, the issue of display width is not directly addressed, probably because it is not a requirement, such devices being geared specifically to the visual field of a single user.

High specification, large, multi-viewer infinity displays in existence today would appear to be at best of comparable size to the HinesLab CCID which, as mentioned earlier, is ideal for cockpit scene simulation but is arguably not thin enough in profile to satisfy the full breadth of many potential applications.

Indeed, the adoption of thin profile infinity display systems by the domestic sector would turn it from an abstruse technology to an every day, broad application, visual display device, most likely in the form of a "deep-view TV" and/or an "infinity window". The latter would effectively render a scene e.g. a rural landscape as if it were at infinity focus, creating the illusion of a "real scene" existing beyond the display as if one were looking through an actual window.

Other applications abound. A thin profile or to use today's nomenclature "flat-screen" infinity display, would enhance the immersive experience of high-end arcade machines, proprietary game consoles and other entertainment oriented systems that rely on taking the user one step closer to "reality", by offering a convincing simulation. If autostereoscopic images were included, then the visual experience would be even more exciting.

BRIEF SUMMARY OF THE INVENTION

The present invention seeks to provide a viewing system that is capable of rendering a scene at infinity focus, whilst simultaneously offering motion parallax and autostereoscopic views by combining an infinity display (based on a light guide) with a lenticular array (a plurality of cylindrical lenses or "lenticules"), the advantages of the combined technologies overcoming the inherent drawbacks of each. The forging of these two technologies results in an overall superior display, the collimating optics of the light guide can be more compact, while the orthogonal distortion that besets deep-view lenticular autostereoscopes (brought on by the astigmatic properties of their cylindrical lenslets), disappears. Indeed, by combining features of an infinity display with a lenticular array, the present invention offers what is effectively a high quality auto stereoscopic infinity display. However, although auto stereoscopic viewing of near range objects is possible (with some compromises), the device is designed to preferentially display uncompromised mid to distant autostereoscopic views. Note; the above mentioned lenticular array serves two purposes in that it (a) collimates light in the horizontal plane as required by the infinity display and (b) affords motion parallax in the horizontal plane by bringing to infinity focus multiple, juxtaposed images, (one beneath each lenticule), as is usual for lenticular displays.

Technically, therefore, the present invention displays images in 2.5D (as opposed to a true 3D, which to qualify should, some would argue, also offer motion parallax in the vertical plane). Furthermore, the technology behind the present invention preferentially offers motion parallax for middle and background scenery over foreground scenery. Foreground objects can also be displayed in 2.5D but if very near will suffer from some vertical distortion and will tend to "frame jump" as each facet of the image is revealed to the viewer as they move their head in relation to the scene. Therefore, this device is intended primarily to present distant and middle distance views although as shall be described later, certain hardware configurations will allow foreground viewing.

The invention described herein is intended for multi-user viewing though any single viewer may of course use it.

An object of this invention is to provide a viewer or viewers with an artefact free, high resolution, 2.5 dimensional view of any desired scene in full colour, with a wide lateral-viewing angle while providing smooth motion parallax in one visual plane, together with full depth perception of all middle and background objects. As will be described later, one particular configuration of the present invention does lend itself to the display of foreground objects though at the cost of background image clarity. Furthermore, although intended as a 2.5D display, the present invention can function solely as an infinity focus 2D display when the aforementioned lenticular array is replaced by a single objective. However, failure to exploit the autostereoscopic properties conferred by the lenticular array (perhaps in a budget version) would be to restrict the full capability of this device.

Assuming 2.5D capability, depth perception will arise principally from focal and binocular disparity cues and horizontal motion parallax.

The present invention comprises; an infinity display system with autostereoscopic capability consisting of; a partially transmissive light guide optically coupled to a lenticular array; a spatial light modulator (SLM) displaying a row of contiguous images, each image coupled to a lenticule; one or more achromatic lenses optically centred so as the "vertical rays" of the SLM's illuminated image points are expanded, collimated and redirected onto the light guide's entrance pupil; a substantially collimated light source providing illumination for the SLM; a non-reflective screen covering a large refractive prism, such as a Fresnel prism, the latter being mounted on the display for the purpose of redirecting its light toward the observer and; a refractive prism (an optical conjugate of said Fresnel prism) for spectrally dispersing light prior to it entering the light guide.

Preferably, said light guide has first surfaces of two mirrors, at least one of which is partially transmissive or; said light guide has two partially transmissive first surfaces allowing displayed images to be viewed from both sides of the present invention or; said light guide is composed of first surfaces on a flat sheet of transparent media such as glass, where at least one of the first surfaces is partially transmissive. The optical component for collimating horizontal rays (that have been modulated by an SLM), consists of a plurality of cylindrical astigmatic lenses such as are found in a lenticular display or; a single linear array of stigmatic lenses if we wish to simultaneously collimate both the vertical and horizontal rays. In one embodiment, a refractive prism would be used to spectrally disperse said rays prior to them entering the light guide's entrance pupil so that a "ray straightening" optical conjugate of said prism such as a Fresnel prism can reinstate the earlier relationship between the modulated rays spectral properties and their geometry in accordance with Snell's law, as they exit the display. Alternatively, we can separate the one image into three, displayed on the SLM as displaced red, green and blue images, and then inject them into the light guide without them passing through a refractive prism, thereby allowing the ray straightening optics to both straighten and merge the rays to produce the one, coherent image. Parallax can be improved by sweeping the horizontally collimated rays of spatially modulated light, (the degree of sweep commensurate with the pitch of the lenticular array or linear array of stigmatic lenses if the latter are employed), by rapidly moving said array back and forth in two or more discrete steps with each step being accompanied by a change in perspective of the associated image formed by the SLM. Alternatively, the horizontally collimated rays, mentioned above, are rapidly oscillated by a wedged shape prism in respect to an identical, conjugated static prism. The breadth of field and image resolution in the horizontal plane can also be improved using a lenticular micro-lens array in conjunction with a lenticular macro-lens array such that the lenticular micro-lens array directs three different images into three corresponding lenses of the macro array, using prior art principles of lenticular micro-lens arrays.

Preferably, the partially transmissive first surface of the display is graded so as to create a picture of uniform brightness by emitting more light as the reflected beam gradually attenuates. An anti reflection screen/film is placed on the surface of the transmitting face of the light guide in order to remove reflections from external light sources, although it may also be placed on top of the Fresnel screen if the device is likely to be viewed in very bright surroundings.

Hence the present invention uses technology that is relatively simple and does not require expensive image rendering components such as MEMS (Micro Electro Mechanical Systems) and HOE's (Holographic Optical Elements), both frequently found in high-end autostereoscopic systems and so its application could extend to areas where depth perception is (or maybe) desirable but not previously considered, such as large screen 2.5 D displays for the home and office, as mentioned earlier.

Before embarking on a description by reference to accompanying drawings, it should be noted that for clarity, all rays that lie in a plane parallel to the entrance pupil's length, are herein referred to as "horizontal rays" and those that are in a plane normal to the entrance pupil's length will be referred to as "vertical rays".

A particular embodiment of the invention will now be described by way of example, with reference to the accompanying drawings, through which like parts are referred to by like references and in which:

BRIEF DESCRIPTION OF THE DRAWINGS

FIG. 2. Shows how light, specifically the vertical rays, pass through a transmissive SLM and how the image encoded rays are then reflected, spectrally dispersed and collimated before being accepted into the entrance pupil of a light guide that is comprised of two mirrors at least one of which is partially transmissive so allowing light to exit from the whole surface of the mirror. The image encoded rays are then shown to pass through an anti-reflective film and finally, a Fresnel screen.

FIG. 3. Shows an alternative means of collimating the light using a parabolic reflector.

FIG. 4. Shows how light, specifically the horizontal rays, pass through a transmissive SLM and how the image-encoded ray is then collimated using a lenticular array before being accepted into the entrance pupil FIG. 5. Shows an alternative means of collimating the light in the horizontal plane before it is passed through a transmissive SLM, using a white light laser.

FIG. 8. Shows how the position of a vertical image can be adjusted by similarly altering the angle of its collimated light source (shown incident upon the device's entrance pupil). This compensates for "image displacement", an artefact of one of the first surfaces of the light guide/display screen moving out of parallel.

FIG. 9. Qualifies FIG. 8 by showing how a virtual image can be brought to foreground focus by angling one of the first surfaces of the light guide/display screen.

FIG. 11. Shows how the optical limitations of a lens within a lenticular array may be overcome by moving said array in discrete steps in concert with an SLM switching at circa 120 fps. This approach not only limits optical distortion but also maximises the breadth of view and can also be used to reduce the effect of frame jumping, a known artefact of motion parallax when using lenticular arrays.

FIG. 12. Shows a moving lenticular array in relation to the SLM and light source.

FIG. 13. Is another view of FIG. 12 and shows how rays in the vertical plane are focused onto a collimating lens.

FIG. 14. Shows the collimated rays depicted in FIG. 12 being directed into the entrance pupil of the present invention.

FIG. 15. Shows another means of improving depth of field and breadth of view by using two conjugated prisms, one of which oscillates above the lenticular array.

FIG. 16. Is another view of FIG. 15 and shows how rays in the vertical plane are focused onto a collimating lens before being directed into the entrance pupil of the present invention.

FIG. 17. Shows, how the breadth of view can be increased by using a micro-lens array to preferentially steer the light transmitting through image pixels (a minimum of three) within an SLM.

FIG. 18. Shows how light preferentially steered as described in FIG. 17, impinges on a macroscopic linear array of lenses, which would ordinarily struggle to encompass a wide breadth of view.

FIG. 19. Shows how controlled illumination (controlled dispersion) can be preferentially focused onto pixel elements within the SLM in order to maximise image brightness.

DETAILED DESCRIPTION OF THE INVENTION

Figure 1:
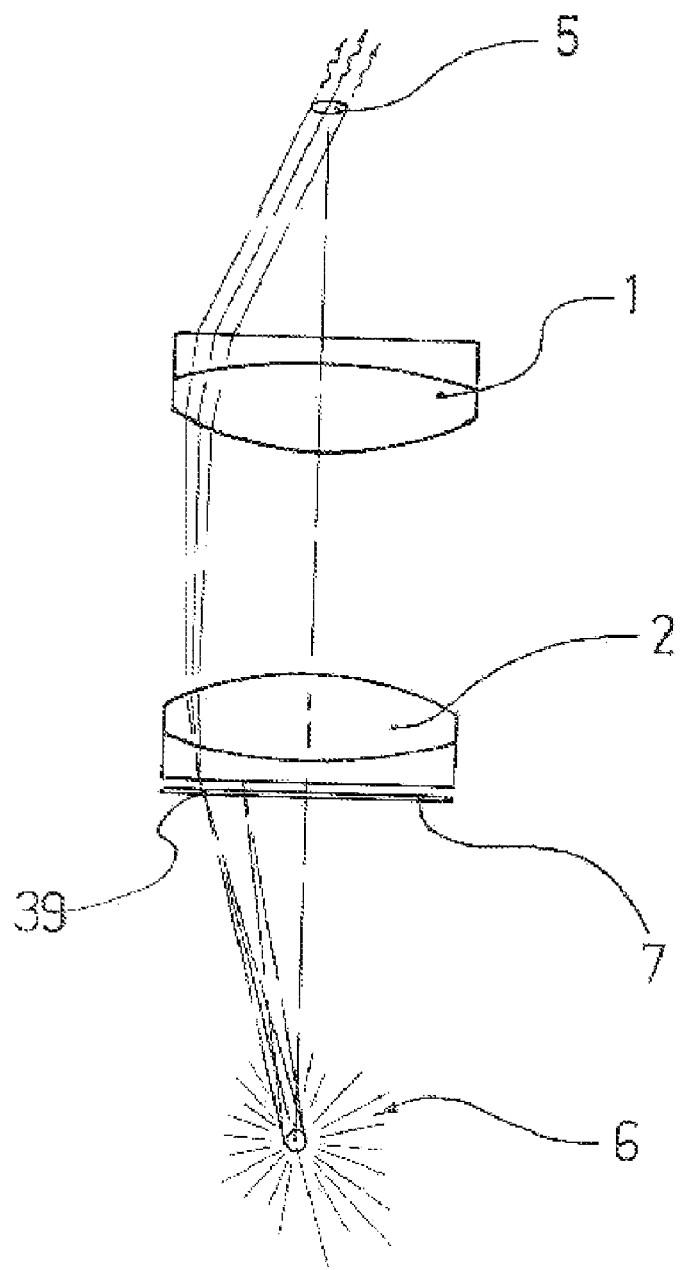
FIG. 1. Demonstrates two fundamental principles behind the invention;
1) how the vertical rays from an SLM can be converged and
2) how the above rays can be collimated, using conjugated achromatic doublets.

Referring now to the drawings, the present invention relies upon the convergence and collimation of modulated light as shown in FIGS. 1 and 2, and the subsequent reflection of said light between two reflective surfaces e.g. two closely spaced mirrors 3 and 4 at least one of which has a partially transmissive first surface 3 that acts as a display. Its autostereoscopic properties arise from a device within the optical path that in most embodiments is a lenticular array 13 that proffers slightly different views generated by an SLM 7 using a prior art method that is well known to those skilled in the subject. The manner in which the said prior art method is adapted and improved to suit the present invention is also discussed as shown for example, in FIG. 15. FIG. 1. shows the basics of how the light rays from the image as a whole are generally converged toward an aperture 5, whilst individual image points undergo collimation as required to produce an image at infinity focus. This can be explained by the relative positions of the actual light source 6 and the SLM 7 in relation to the objective 2. It can be seen how, in FIG. 1, a light source placed at the focal point of a precision objective can undergo precise convergence using a second achromat 1. Even rays that are slightly off axis can be accurately focused on a common plane provided the system is aplanatic (inferred in all Figures throughout). It may therefore be understood that a light source 6 can undergo near perfect focusing on a flat plane by way of two finite to finite achromats 1and 2 while crucially, the same two achromats 1 and 2 can also form a finite to infinite conjugate pair in terms of the SLM's 7 image points. Hence, by positioning the second lens 1 a specific distance from the fixed objective 2, narrow beams of light from each image point 39 can be collimated and simultaneously refracted toward the optic centre which by design coincides with the entrance pupil 5 of the light guide. In one embodiment, light from the source may be partially collimated before reaching the SLM 7 as shown in FIG. 3, obviating the need for the aforementioned objective 2.

FIG. 1. could in principle represent an arrangement of stigmatic lenses (convex/concave in two planes) and the above principles would still apply but in the case of the described invention, actually relates specifically to an arrangement of astigmatic lenses, (cylindrical achromats) where the uppermost cylindrical lens 1 and lower most cylindrical lens (objective) 2 in FIG. 1 are shown end on. As such, it can be seen from this diagram how vertical rays may be collimated into a narrow beam.

Figure 6:
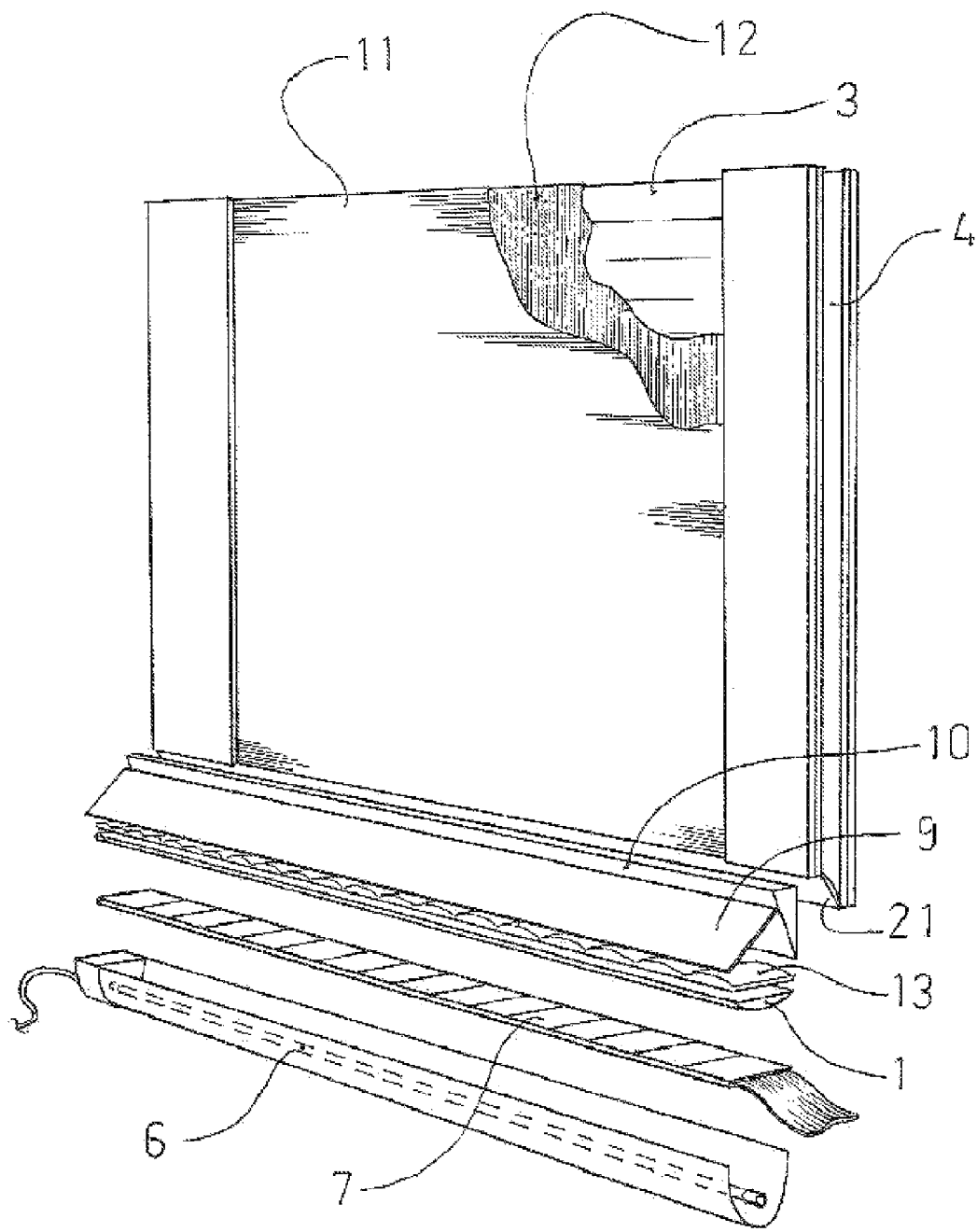
FIG. 6. Shows an exploded view of a preferred embodiment of the invention, indicating all major optical components.
Figure 21:
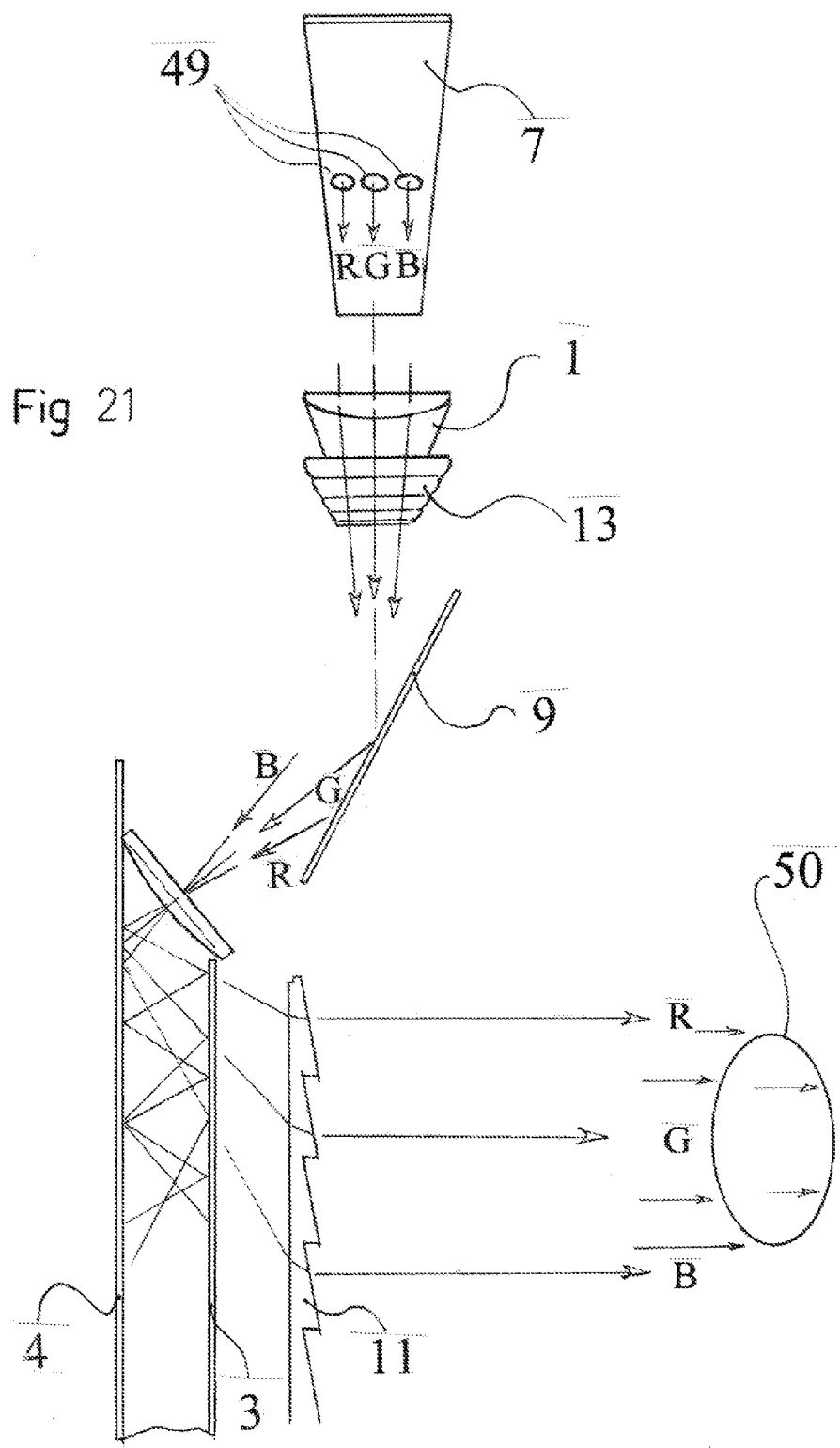

This is shown again in FIG. 2. Except that the rays are reflected by a mirror 9 and refracted by a prism 10 before they enter the light guide's horizontal aperture 5, also known as an entrance pupil. This is done in order to direct the chief rays 8 at circa forty five degrees into the entrance pupil 5 whilst forcing spectral dispersion. The purpose for forcing spectral dispersion (expedient but not essential, as colours relating to the same image point can, alternatively, emerge from pixels spaced on the SLM so as to replicate said dispersion) is to allow final conjugation of the colours once they exit the display through the Fresnel screen 11. This process is a reverse transform where colours are first separated and then by reversing the process, recombined using isomorphic optical components, in this case, wedged shaped prisms. Hence, light from the partially transmissive first surface display mirror 3 is refracted circa forty five degrees by the Fresnel screen 11 such that the chief rays 8 are normal to the display, (in one embodiment, both first surfaces 3 and 4 are partially transmissive resulting in a "two-faced" display 35, FIG. 7). However, as mentioned above and shown in FIG. 21, if the image can be first separated into its component colours 49 and each displayed separately on the SLM 7, then said Fresnel screen can both merge and straighten the images into one, cohesive image 50. Having exited the Fresnel screen 11 the image rays then pass through an anti-reflection screen 12 as shown in FIG. 6. Anti-reflection screens and films represent a mature technology and the more sophisticated rely upon the circular polarisation of incidental light.

Figure 20:
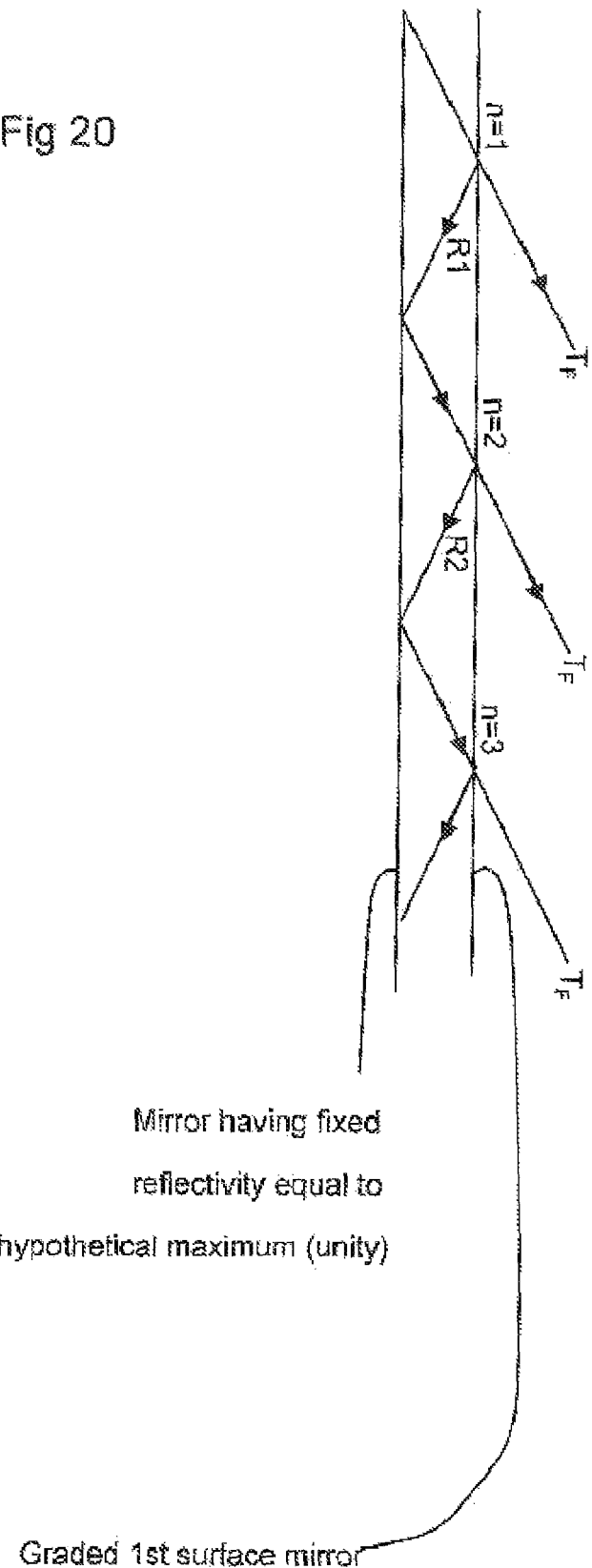
FIG. 20. Shows attenuation of an internally reflected light ray and how it can be compensated for by use of a graded mirror FIG. 21. Shows an SLM generating three separate images of the same object (a circle), each image being of a primary colour, red (R), green (G) and blue (B). When the rays from each colour finally refract through the Fresnel screen shown, the three separate colour images are fused into one.

Returning to the light guide. As discussed earlier, once the collimated rays enter the light guide a small amount of light can escape from the partially transmissive mirror 3. Since this occurs every time a ray is reflected there will be a steady attenuation in the strength of the reflected light as it traverses the light guide, were it not for grading of the mirror. Grading in this case means gradually reducing the reflectance of the mirror so that a fixed amount of light is transmitted at every reflection point, which can be accurately derived using a light diminution formula thus (and referencing FIG. 20):

For a graded mirror (reflectivity declining as a function of length), designed for a fixed transmission luminosity value, $T_f$ and where;

$R_n$ represents the strength of the ray at point N and;
$R_g$ represents the graded reflectivity at point N, then;

|  | | | |
|---|---|---|---|
|  | $R_1 - R_2$ | = | $T_f$ | Case 1. |
| And; | $R_n$ | = | $1 - n T_f$ | Case 2. |
| And; | $R_{n+1}$ | = | $R_g(R_n)$ | Case 3. |

By reference to above and using transposition of formula:

| | | | |
|---|---|---|---|
| $R_n - R_{n+1}$ | = | $T_f$ | (Refering to Case 1.) |
| $\therefore R_{n+1}$ | = | $R_n - T_f$ | |
| $R_g$ | = | $(R_{n+1})/R_n$ | (Refering to Case 3.) |

Therefore:

| | | |
|---|---|---|
| $R_g = R_n - T_f/(1 - n T_f)$ | = | $((1 - n T_f) + T_f)/(1 - n T_f)$ |
|  | = | $1 - (T_f/(1 - n T_f))$ |
| Hence, when $T_f = 0.01$, $R_g$ | = | $(n = 1)\ 0.989899\ldots(n = 2)\ 0.989796\ldots$ etc., |

In this way the graded, first surface mirror 3 allows an image or scene of approximately uniform brightness to be displayed.

With regard to the aforementioned horizontal rays, these can be collimated by various means. In one embodiment, as shown in FIG. 4, a lenticular array 13 is used. Rays emanating from the light source 6 pass through an SLM 7 and then through a cylindrical lens 2 before entering the lenticular array 13. It should be noted that each facet of the lenticular array receives light from an area of the SLM 7 which is of corresponding width and which contains one perspective view of the scene. Next, the rays are reflected by a first surface mirror 9 (occurrence of single ray reflection shown at point 14). The ray is then angled toward the entrance pupil by the prism 10 (shown as entrance juncture 15 and exit juncture 16) and passes a final cylindrical collimating lens 21, though the latter is optional depending on the quality of the prior optics. Light rays entering the entrance pupil are then reflected between the two main mirrors 3 and 4, and shown as reflection points 17, 18, 19 and 20, where 17 and 19 are reflections off mirror 4, and 18 and 20 are reflections off mirror 3.

Therefore, FIGS. 2 to 4 between them show how light passing through an SLM 7 is collimated in two planes before being directed into the present invention's entrance pupil.

Figure 5:
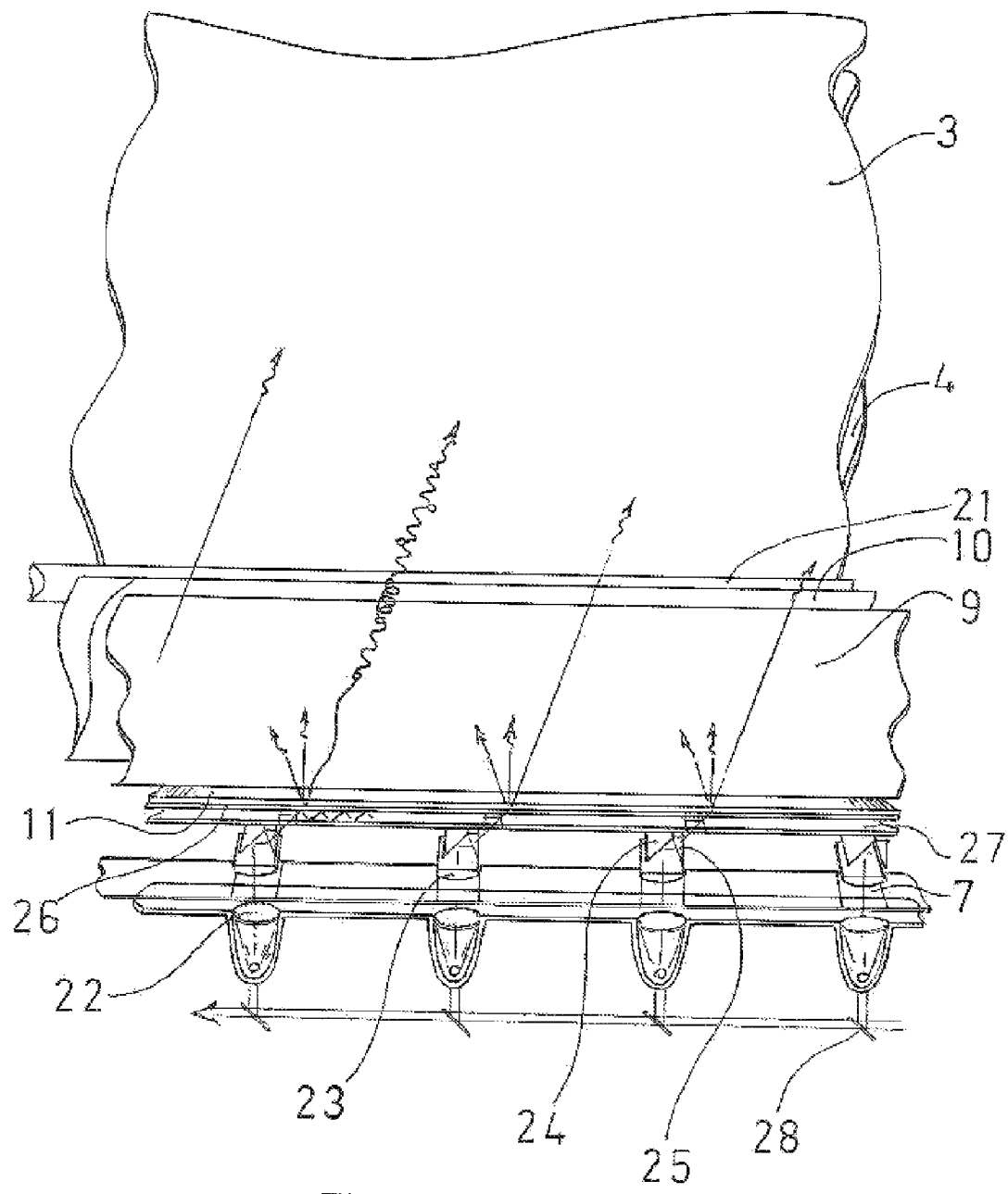

FIG. 5 shows another option for collimating rays in the horizontal plane using a white light laser that is partially reflected by first surface mirrors 28 directly below each SLM 7. Each beam is then diverged and re-collimated using a beam expander 22 and focused onto one of a number of smaller analogues (sub light guides) of the previously described embodiment. Image rays from the sub light guides are then directed into the entrance pupil 5 of the device's principal light guide/display. Each of the sub light guides consists of a cylindrical lens 23, a wholly reflecting first surface mirror 24, a wedge shaped prism 25, a graded, partially transmissive first surface mirror 26 and a parallel, wholly reflecting first surface mirror 27. This results in the horizontal collimation of light radiating from each of the image points on the SLM 7.

Lasers are however expensive and laser light can be difficult to manipulate. Its high spatial coherence can lead to speckling and the introduction of interference bands in certain optical arrangements.

Nevertheless, other ways of collimating the horizontal rays do exist, as shown in FIGS. 11 to 19. Looking first at FIGS. 11 to 16, these illustrate two different approaches that rely upon the spatial multiplexing of images using moving optical components.

FIGS. 11 to 13 show how improved collimation may be achieved using a moving lenticular array. Here, a narrow, collimated beam 29 exits a lenticular array 13, the latter moving in a series of small steps in relation to the SLM 7. Every time the array increments across one step 32, the image on the SLM moves in concert. In this example the array 13 moves four times to the right and then four times to the left such that four movements of the beam 29 correspond to the width of a lens 33 within the array 13. Provided this cycle occurs within circa $\frac{1}{30}^{th}$ of a second, the image will appear to be flicker free. The advantage of oscillating this narrow beam is best explained in terms of the optical properties of the array 13 in so far as each lenticule will experience some degree of optical distortion that becomes more evident, the broader the beam 29. This will occur to some extent even in the most highly optimised conjugation of lenses (which is assumed to apply in the case of the present invention and shown here in FIG. 12 and elsewhere as an array of simple, astigmatic, lenticular lenses 13). Hence the need for stopping down the beam. Another advantage of this approach is that the virtual image can be viewed in smoother motion parallax given each image point, depending upon the intended depth of the virtual image, moves a slightly varying amount for every discrete step of the array 13, thereby reducing the size of each "frame jump", and in so doing, the "picket fence effect", so often associated with lenticular auto stereo scopes.

In FIGS. 15 and 16 a similar effect is produced by oscillating a prism 30 in relation to a fixed prism 31 positioned above the array 13. Again, this has the effect of sweeping a narrow, collimated beam back and forth 33, the difference being image points on the SLM 7 will remain stationary throughout the cycle unless smoother horizontal motion parallax is sought. If improved motion parallax is sought, relevant image points will move an appropriate distance at the appropriate time, creating a segment of light with a subtended angle commensurate with the distance of the virtual image point being rendered. In other words, image points on the SLM representing a virtual image point set at infinity will remain where they are but image points on the SLM that represent virtual foreground image points will move, the frequency and degree of movement being entirely dependant upon the refresh rate of the SLM 7.

The present invention can therefore be complex, requiring moving optics to improve image quality and breadth of view, or simple and utilise static optics as shown in FIG. 6. Both have preferred applications. If a simple scene with no foreground imagery is under consideration (hence smooth motion parallax is of secondary importance) or for that matter one of limited breadth of view, then a static system would be entirely suitable. For wider viewing angles, the inclusion of foreground scenery and smoother motion parallax, moving optics should be considered. However, there is another arrangement that has yet to be discussed that offers a compromise between the two in that it is a static system offering limited motion parallax, as before, yet can provide a wide breadth of view. This system is shown in FIGS. 17 to 19 and uses a lenticular array of micro-lenses 38 to steer the light in three directions at once (much like a lenticular playing card offering three different views at three different viewing angles). Hence, there are three image points 39 (each consisting of one or more pixels) beneath every lenticular micro-lens. Light passing through an SLM 7 is then directed onto the larger lenticular 13 above, namely the lens directly above any given image point 39 and the lenses either side of it. This effectively triples the breadth of view by allowing the one section 40 of the SLM 7 to transmit images to three adjacent lenses that between them embrace a controlled, spatially modulated beam of fixed divergence 42. It should be noted that the lenticular micro-lens array 38 should not become obvious under magnification (as a consequence of beam collimation by the lenticular macro-lens array 13) as it consists of transmissive elements—hence there should be no light reflecting off them nor should there be any shaded lens junctions that might otherwise reveal their presence. Furthermore, the micro-lenses will actually help blend the underlying pixels and, cost permitting, should be considered for all embodiments of the present invention where an LCD is used as an SLM.

In order to maximise the light entering the SLM a second set of identically pitched micro-lenses 41 can be used to preferentially focus and steer the incoming light onto the image points in such a way as to bias the light from say the outermost pixels, centrally, toward the optic centre of the corresponding lens within the uppermost micro-lens array 38, as shown in FIG. 19.

Micro-lens arrays must be very carefully positioned. In general, the accurate arrangement of all the optical components within the system is understandably of great importance, none more so than the parallelism of the two main mirrors 3 and 4. If there is accidental convergence of even a fraction of a degree the display will throw images into foreground focus and will no longer function as a true infinity display. One way of overcoming this problem is to use a robust, low cost configuration in the form of a single sheet of transparent media e.g. glass. The glass sheet would need to be thicker than the separation space afforded to the previously discussed mirrors 3 and 4, due to the higher refractive index of glass (no air gap). To enable reflection (not total internal reflection) the glass must be coated on both faces with a reflective layer that corresponds to the reflective layers of the previously described mirrors 3 and 4 whereby at least one of the two sides is a graded, partially transmissive surface.

Figure 7:
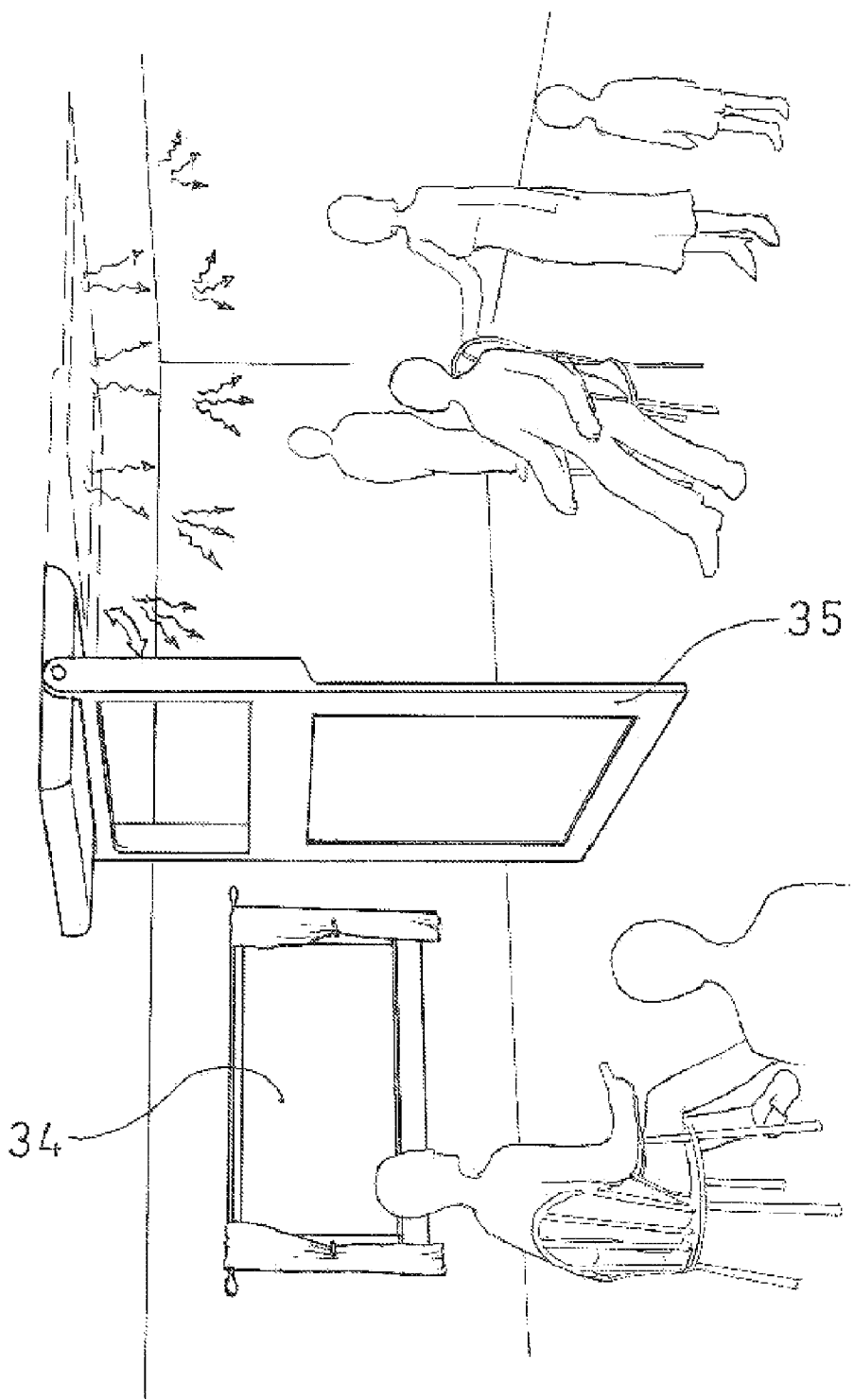
FIG. 7. Shows two embodiments of the invention. One being a large flip down TV version that can be viewed from both sides and that when retracted into the ceiling can also function as a light source or even a virtual sky-light. The second embodiment is in the form of a window as shown on the back wall.
Figure 10:
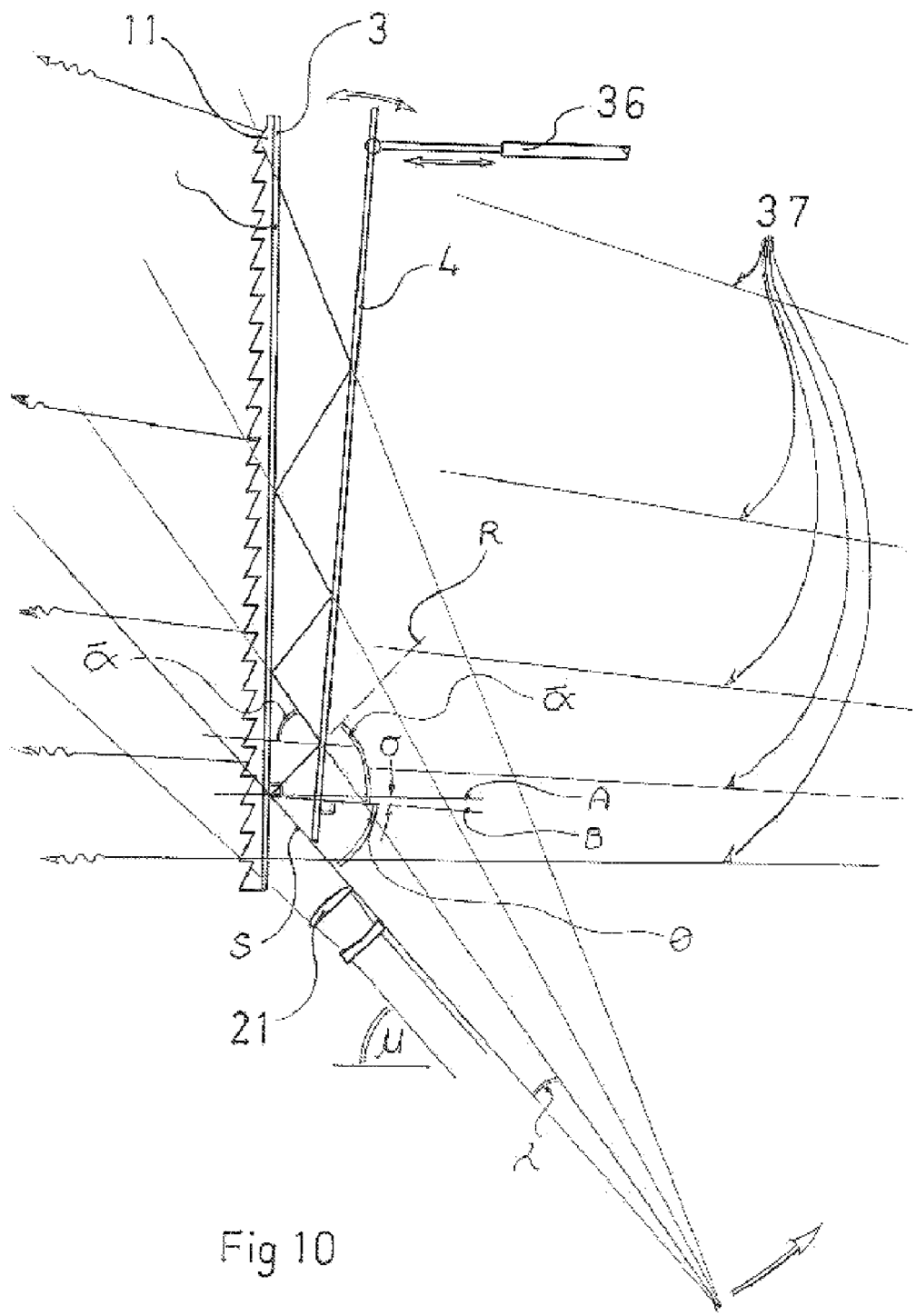
FIG. 10. Shows how, by altering the angle between the reflective first surface mirrors of the light guide/display screen, a virtual image can be made to appear either in front of or, (as in this case) behind it. The relationship between the inclusive angle of the reflective surfaces and the projected distance of the virtual image is also shown graphically and explored mathematically by way of Euclidean geometry.

The relatively thicker glass would also add strength to the mirror and should keep the cost of production down. This is herein described as the monolithic option. It is suggested here that when the present invention functions primarily as an infinity display or as shown in FIG. 7 an "infinity window" 34 (a display functioning as a virtual window) offering convincing views of distant and middle distance scenery; it would benefit from being constructed along the lines of the monolithic option. However, with regard to a TV 35 based on the present invention as shown in FIG. 7, a variation on the two mirror approach as shown in FIG. 10 is necessary, as scenes are not displayed in splendid isolation or carefully selected as to be conducive to infinity viewing. Instead, the viewer is presented with a succession of scenes many of which are foreground based. To display a real foreground scene at infinity focus would not present a problem for the present invention in its monolithic embodiment but to do so could cause visual confusion, as actors in close up would appear to be of gigantic stature and would be no more real in the mind of the viewer than if they were shown on a surface display device e.g. CRT, LCD or plasma screen. To overcome this, the "two-mirror" embodiment of the light guide can re-focus light so that a real foreground object can appear as a virtual foreground object, perfectly focused in both the horizontal and vertical plane, though at the cost of background image clarity. However, the loss of background clarity and the associated image distortion (both artefacts of the depth compensation mode which shall be shortly described by way of reference to FIG. 10), should not present a significant problem. This is because there is invariably only one subject of interest, like a leading character, and since under normal circumstances one is generally unaware of peripheral detail (which in reality is usually out of focus anyway), the viewer should perceive the principle subject at least, as being "real". The problem is further ameliorated by the fact that scenes incidental to the subject will not undergo unacceptable distortion provided:

1. The subject matter is displayed as if positioned at least several meters behind the screen.
2. The images are displayed in such a way that there is an optimised viewing zone (distance wise) where the viewer is advised to position themselves.

The method by which this is achieved is by micrometric movement of one of the two main mirrors servo linked 36 to dynamic optics, as illustrated in FIG. 10. This shows how the image can be brought to focus at a distance other than infinity, represented as divergent virtual rays 37.

If we assume an entrance pupil width of 5 mm, the rear mirror 4 need only move 0.1 degs in order to project a subject 2.025 meters behind the screen. Calculated thus:

Let $\sigma$=inclusive angle between mirrors, equivalent to the inclusive angle between the line normal to mirror 4, B and the line normal to mirror 3, A Let $\acute{\sigma}$=inclusive angle between B and the first reflected ray R Let $\theta$=inclusive angle between B and the collimated ray S Let $\mu$=incident angle of collimated beam (assume 45 deg)

Let W=width of entrance pupil

Using Euclidean axioms:

$$\acute{\alpha} = \theta + 2\sigma$$

$$\lambda = (90° - \acute{\alpha}) - (90° - \theta)$$

$$\lambda = 2\sigma$$

Assuming the Fresnel prism angles the beam toward the horizontal plane, then for focal distance $F_d$:

$$F_d \sim W^*(\text{Sin }\mu)^{-1}*(\text{Tan }2\sigma)^{-1}$$

Therefore $F_d \sim 5$ mm*1.414*286=2025 mm

However, movement of the rear mirror 4 not only changes the focal distance of the virtual image but displaces it spatially ("image displacement") as shown in FIG. 8. To compensate for this, both the wedged prism 10 and the first surface reflector 9 must cooperate in tilting the beam (hence, the virtual rays 37) to correct its angular displacement. Furthermore, the narrow cylindrical lens nearest the entrance pupil 21 is used to expand the light by, in the case of a 0.1 deg tilt, 0.2 degs inclusive (i.e. 2σ) so as it corresponds to the divergence of the virtual rays 37.

To expand the rays in the horizontal plane, the lenticular array 13 is moved fractionally closer until the horizontal rays subtend the aforementioned angle of 0.2 degrees. This effectively creates cones of light that correspond to the virtual image points of our subject—now, as described earlier, displayed 2.025 meters behind the screen.

It is also worth noting that virtual images can also be displayed in front of the screen by tilting the rear mirror 4 as in FIG. 9 the opposite way and moving the prior optics 21, 10, 9 and 13 so that a convergent cone of light intersects where the subject is perceived to be positioned. Though this has some potential in terms of entertainment novelty it is not an effect that lends itself to normal viewing as all background scenery will be severely distorted and viewers close to the virtual image will likely see only a partial view of the subject while those in front of the virtual image will see nothing. However, if the subject is small and shown in the absence of a background (or if the background is inconsequential), it should create a striking effect.

In order to achieve variable focusing, the large movable mirror and all the smaller movable optics must respond quickly to scene changes. It should be clear to someone well versed in existing servo technology that this should not present a technical problem as such and that the aforementioned components should be able to move in concert with sufficient rapidity as to keep up with rapid changes in a subject's focal distance. Areas for careful design consideration relate to unwanted harmonics that might arise in a poorly designed, $3^{rd}$ order system. Micro-movement of the rear mirror 4 could be accomplished using a linear actuator 36 and the same applies to the smaller optics—accepting that non-occluding support structures might be required to prevent unwanted vibrations. Suffice to say current technology provides a means of moving all necessary optics in the manner required.

Figures 22, 23:
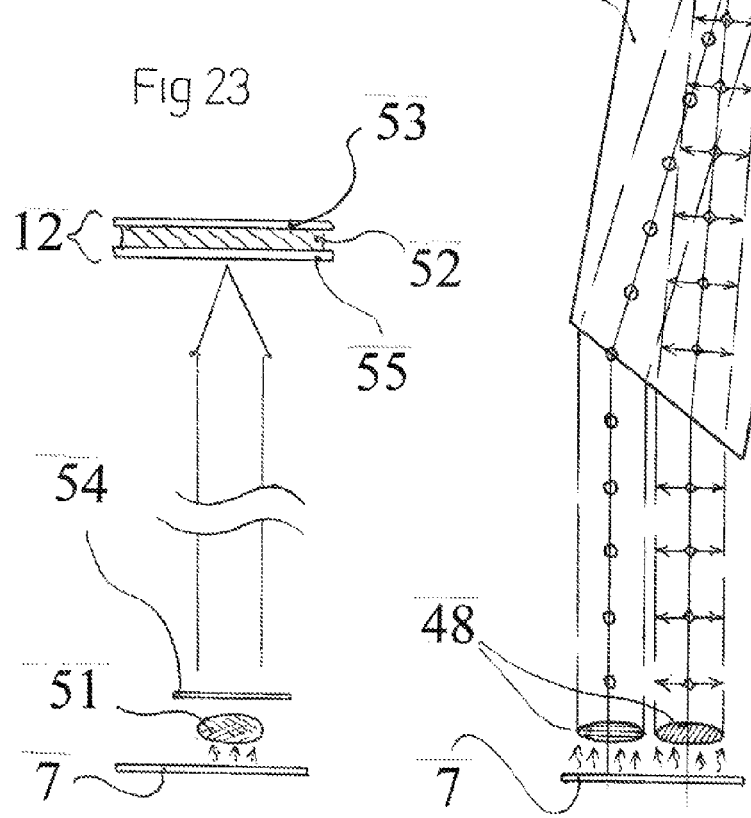
FIG. 22. Shows a stereoscopic version of the present invention, whereby two images on the SLM each intended for one or other eye of a viewer equipped with circularly polarised glasses, travel through linear polarisers before undergoing anisotropic refraction through a birefringent medium such as a calcite crystal; circular polarisation upon exiting the crystal and eventually, injection into the entrance pupil of the light guide.
FIG. 23. Shows a stereoscopic version of the present invention, whereby alternating perspective views of the subject are displayed on an SLM, in synchrony with a switchable linear polariser.

Since this device is capable of fulfilling the role of a TV display, one may also want to consider a stereoscopic version. This would offer the viewer stereoscopic views at all depths of field including the apparent projection of objects from the screen, but this does of course necessitate the wearing of glasses. The stereoscopic mode can be achieved in one of a number of ways. Referring to FIG. 23; if an orthogonally switchable linear polarizer 51 is placed in front of the SLM, an image encoded beam is produced, which can be switched (at high frequency) in accordance to the image displayed on the SLM, affording alternate perspective views to someone equipped with appropriate polarising glasses. If switchable polarisers are used, then the linear polariser 52 that forms part of the anti-reflection screen 12 would need to be orthogonally switched to match the polarised light being projected from the screen. Furthermore, a second quarter-wave retarder 53 must be placed on the opposite side of the anti-reflection screen, in order to circularly polarise the light. Alternatively, if we persist with the switchable polarising option; a quarter-wave retarder 54 can be placed in front of the polariser, circularly polarising the beam as it travels through the display apparatus. However, in this case, a three-quarter wave retarder must be incorporated into the anti-reflection screen instead of a quarter-wave 55 so as the original linear polarity of the beam can be briefly reinstated, before it passes through the switchable polariser 52 and finally, quarter-wave retarder 53. Of course, the displayed image must be viewed using circularly polarised glasses just as one would when viewing a "3D" movie.

If fixed polarisers are used as shown in FIG. 22, a birefringent crystal e.g. calcite 45 is used to merge two linearly polarised beams (images that have passed through orthogonal polarisers 48) each encoded with information specific to one or other eye. The merged beams then pass through a quarter-wave retarder 46, which circularly polarises them. Although the beams occupy the same light path 47 they are of opposite chirality. Said beams then continue through the light guide as described in previous descriptions of the present invention, except now two overlaid images are displayed. Again, to use the stereoscopic facility the anti-reflection screen must be disabled and since we are discussing fixed polarisers, said screen must roll/fold back.

On a general note it may be appreciated that although throughout all drawings representing the vertical and horizontal collimation process of light leaving the SLM 7 show two discrete optical systems, it should be evident to one versed in optics that the cylindrical lens 1 or lenses 1 & 21 for collimating the vertical rays can be combined with the lenticular array 13, resulting in what would appear as a linear array of stigmatic lenses. Where cost allows, this is the preferred arrangement for a simple static system although for the purpose of explaining the workings of the infinity display, it is expedient to separate the two, as I have done here.

It may also be appreciated that the optimum optical arrangement for reducing astigmatism and chromatic distortion (an anastigmatic arrangement) is implicit within each diagram that has been featured. Similarly, optical configurations are denoted for the most part by a simple arrangement of lenses, whose curvature and other physical properties are purely representative and are not intended as a real lens solution.

The invention claimed is:

1. An Infinity display system with Autostereoscopic capability comprising;
   a partially transmissive light guide optically coupled to a lenticular array; a spatial light modulator (SLM) displaying a row of contiguous images, each image aligned with and directly behind a lenticule positioned to direct and collimate the SLM's horizontal rays; one or more lenses that are optically centred so as to expand, collimate and redirect the SLM's vertical rays onto the light guide's entrance pupil; a substantially collimated light source providing illumination for the SLM; a non-reflective screen covering a ray straightening prism the latter being mounted on the display for the purpose of redirecting its light toward the observer and; a refractive prism for spectrally dispersing light prior to it entering the light guide.

2. An infinity display as claimed in claim 1, whereby said light guide has first surfaces of two mirrors, at least one of which is partially transmissive.

3. An infinity display as claimed in claim 1 whereby said light guide has two partially transmissive first surfaces allowing displayed images to be viewed from both sides of the present invention.

4. An infinity display as claimed in claim 1 whereby said light guide is composed of first surfaces on a flat sheet of transparent media such as glass, where at least one of the first surfaces is partially transmissive.

5. An infinity display as claimed in claim 1 whereby said lenticular array consists of a plurality of cylindrical astigmatic lenses.

6. An infinity display as claimed in claim 1 whereby said lenses and said lenticular array are substituted for a single linear array of stigmatic lenses.

7. An infinity display as claimed in claim 1, whereby a wedge prism is used to spectrally disperse a spatially modulated beam prior to it entering the light guide's entrance pupil.

8. An infinity display as claimed in claim 1 whereby collimating optics are rapidly moved in order to sweep a horizontally collimated beam of spatially modulated light, by rapidly moving said lenticular back and forth in two or more discrete steps and with each step being accompanied by a change in the perspective of the associated image formed by the SLM.

9. An infinity display as claimed in claim 1 whereby a refractive prism is used to sweep a horizontally collimated beam of spatially modulated light by rapidly oscillating said prism in respect to an identical, conjugated, static prism.

10. An infinity display as claimed in claim 1 whereby the field of view (FOV) and image resolution is improved using a lenticular micro-lens array coupled to a lenticular macro-lens array such that the lenticular micro-lens array directs two or more different views into the macro array using prior art principles such that each lenslet of the macro array receives two or more separate images which are merged and displayed allowing each said lenslet to cover a commensurately broader area of the SLM.

11. An infinity display as claimed in claim 7 whereby spectral dispersion takes place using a Fresnel prism.

12. An infinity display as claimed in claim 1, whereby a Fresnel prism is used as the ray straightening prism.

13. An infinity display as claimed in claim 1, whereby an anti reflection screen/film is placed on the surface of the transmitting face of the light guide in order to remove reflections from external light sources, although it may also be placed on top of the ray straightening prism if the device is likely to be viewed in very bright surroundings.

14. An infinity display as claimed in claim 1, whereby the partially transmissive light guide has at least one first surface that is graded.

15. An infinity display as claimed in claim 2, whereby the first surfaces of the light guide can be tilted in respect to one another so as to project images at various depths of field.

16. An infinity display as claimed in claim 1, whereby the primary colours of an image displayed on an SLM, are displayed as three separate images; their physical separation relating to their respective refractive angles, such that when said images pass through the ray straightening prism, all three images merge into one.

17. An infinity display as claimed in claim 1, whereby two beams of circularly polarised light, each carrying an image intended for one eye and each of an opposing circular polarity are used in the creation of a stereoscopic view; thus, a birefringent crystal e.g. calcite is used to merge what are at first linearly polarised beams, each encoded with information specific to one eye; the merged rays then pass through a quarter-wave retarder which circularly polarises them prior to their injection into the light guide's entrance pupil in so doing, the exiting rays must be viewed using circularly polarised glasses, just as one would when viewing a "3D" movie.

18. An infinity display as claimed in claim 17, whereby an orthogonally switchable polariser is used to polarise switching perspective views displayed by the SLM, such that each polarised view is transmitted through the display apparatus, becoming circularly polarised once they have passed through a quarter-wave retarder fixed to or just behind, the anti-reflection screen; the latter having a linear polariser that switches in commensuration with the first mentioned orthogonally switchable polariser.

* * * * *